April 17, 1928.
G. W. PIERCE
VISIBLE TOASTER
Filed Sept. 27, 1927
1,666,398
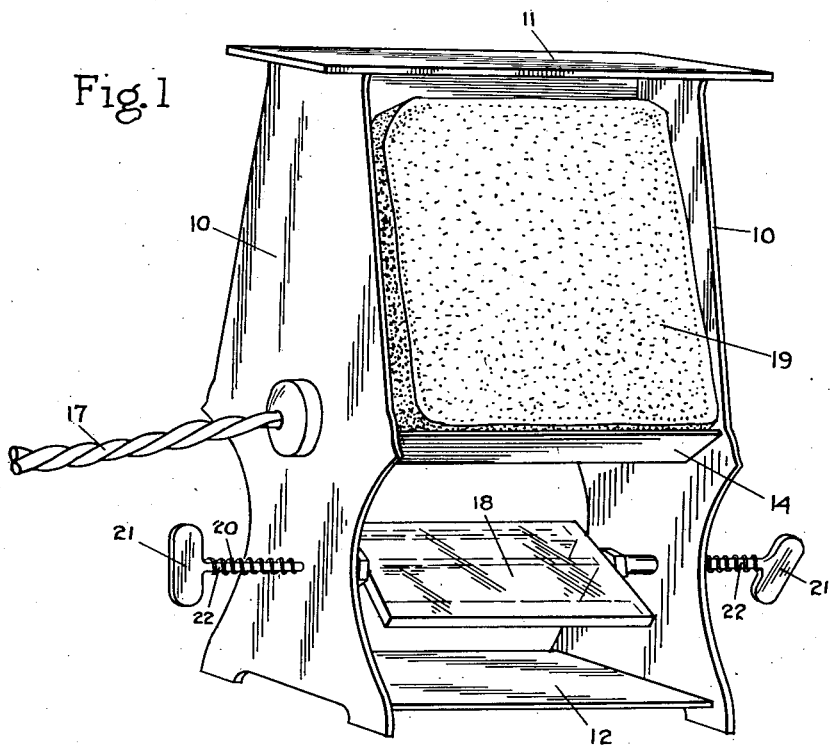
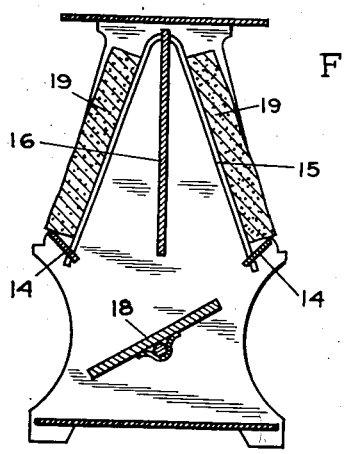
Inventor
G. W. Pierce
By Emil F. Lange
Attorney Patented Apr. 17, 1928.

1,666,398

UNITED STATES PATENT OFFICE.

GEORGE W. PIERCE, OF LINCOLN, NEBRASKA.

VISIBLE TOASTER.

Application filed September 27, 1927. Serial No. 222,307.

My invention relates to bread toasters and its primary object is the provision of a device attached to the toaster and so constructed and arranged as to give to the user a reflection of the bread surface which is being toasted so that the slices may be removed when the toasting operation has gone far enough.

Specifically it is my object to arrange a mirror on the toaster and so positioned as to reflect the sides of several slices of bread which are being toasted, the mirror being angularly adjustable for the convenience of the user.

Having in view these objects and others which will be pointed out in the following description, I will now refer to the drawings, in which—

Figure 1 is an illustration showing one form of bread toaster with my mirror secured thereto.

Figure 2 is a vertical transverse sectional view of the toaster and mirror.

In the drawings I have shown one form of toaster comprising side plates 10, a top plate 11 with a bottom plate 12, the bottom plate 12 being spaced slightly above the lower edges of the side plates 10. The toaster further includes a pair of inclined plates 14 secured to the side plates and also a plurality of inverted V-shaped rods or wires 15 the lower ends of which are anchored in the inclined plates 14 as shown in Figure 2. In the median vertical plane of the toaster there is positioned a support 16 for the heating member. The heating member comprises one or more resistance coils receiving current through the conductor 17. These features are more or less common to nearly all bread toasters but they are varied in an infinite number of ways in the toasters which are available to the purchasers.

My invention relates primarily to the mirror 18 which is so positioned underneath the supporting rack for the bread slices that it reflects the inner surfaces of both slices 19 of bread. The mirror is preferably secured to a spindle 20 having handle members 21 at its opposite extremities. The spindle passes through both side plates 10 and is provided with two coil springs which yieldingly hold the spindle and the mirror in any desired position of adjustment. The mirror 18 may be made of any suitable reflecting material such as burnished or polished metals as well as silvered glass.

In use, the toaster is placed on the breakfast table and the two slices of bread 19 are placed on the rack. The user then adjusts the mirror 18 to a position such that the bottom edge of the support 16 is reflected along the median line of the mirror. When the mirror is in this position it will reflect to the user the toasting surfaces of both slices of bread.

The mirror device makes unnecessary the frequent handling of the bread slices to determine when the toasting is done. It also obviates the necessity of scraping charred surfaces of the toast. The toast may moreover be made with the minimum amount of effort and attention at a time of the day when everything is apt to be hurried. Merely an occasional glance at the mirror will determine the degree of toasting of the bread.

Having thus described my invention in such full, clear, and exact terms that its construction and operation will be readily understood by others skilled in the art to which it pertains, what I claim as new and desire to secure by Letters Patent of the United States is:

1. In combination with a toaster comprising a stand having a rack for supporting a slice of bread and a heating member spaced from said rack, a mirror adjustably secured to said stand and being adapted to reflect the bread surface which is being toasted, and means for yieldably holding said mirror in adjusted position.

2. In combination with a toaster including a stand having side plates, a rack secured to said side plates for supporting a plurality of bread slices and a heating member for toasting the bread slices, a spindle journalled in said side plates and underneath said rack, a mirror secured to said spindle between said side plates, handle members at the outer extremities of said spindle, and coiled springs surrounding said spindle between said handle members and said side plates.

In testimony whereof I affix my signature.

GEORGE W. PIERCE.